F. POST.
OBSTETRICAL FORCEPS.
APPLICATION FILED AUG. 10, 1910.
1,010,176.
Patented Nov. 28, 1911.
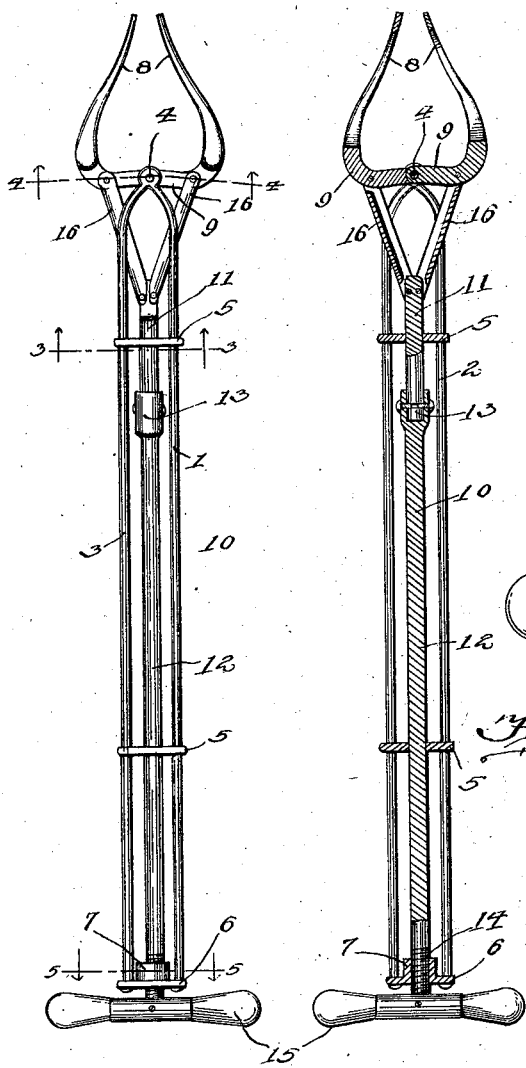
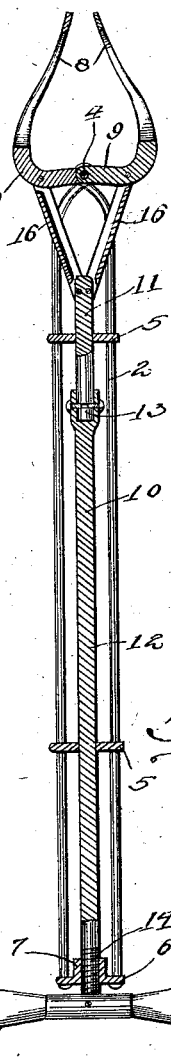
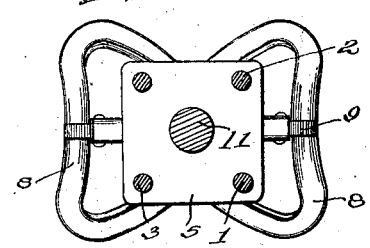
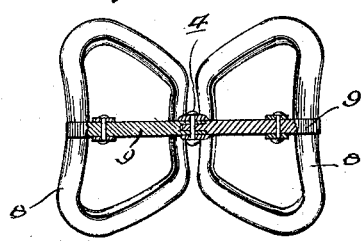
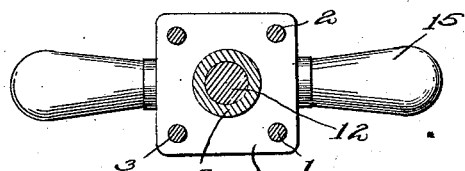
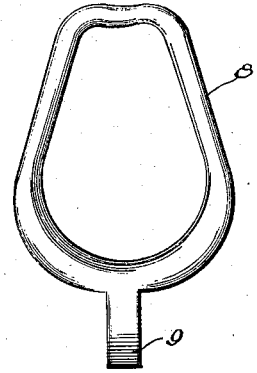
Witnesses
Frederick L Fox.
C. C. Hines
Inventor
Fred Post.
By Victor J. Evans
Attorney

UNITED STATES PATENT OFFICE.

FRED POST, OF LAURENS, IOWA, ASSIGNOR OF ONE-HALF TO CHARLES SUMMER ALLEN, OF LAURENS, IOWA.

OBSTETRICAL FORCEPS.

1,010,176. Specification of Letters Patent. Patented Nov. 28, 1911.

Application filed August 10, 1910. Serial No. 576,464.

*To all whom it may concern:*

Be it known that I, FRED POST, a citizen of the United States, residing at Laurens, in the county of Pocahontas and State of Iowa, have invented new and useful Improvements in Obstetrical Forceps, of which the following is a specification.

This invention relates to improved obstetrical forceps more particularly designed for the use of veterinary surgeons and others in relieving hogs and other animals of their young, but which are also adapted for general obstetrical use, the object of the invention being to provide a simple, inexpensive and efficient construction of instruments of this character which may be employed without injury to the animal operated upon.

The invention consists of the features of construction, combination and arrangement of parts hereinafter fully described and claimed, reference being had to the accompanying drawings, in which:—

Figure 1 is a side elevation of a pair of obstetrical forceps embodying my invention. Fig. 2 is a longitudinal section of the same. Figs. 3, 4, and 5 are cross sections on the lines 3—3, 4—4 and 5—5 of Fig. 1. Fig. 6 is a view of one of the jaws.

The device comprises an oblong rectangular shank formed of two side pieces 1 and 2, each consisting of a pair of spaced wire rods 3. The forward ends of the rods of each side piece converge and are united at their forward ends, the forward ends of both side pieces being connected by a pin or bolt 4. The rods composing the shank are stayed and held from distention at suitable intervals by reinforcing bands 5, and the rear ends of the rods are fitted and suitably secured in openings in a rectangular coupling plate 6 having a forwardly projecting, internally threaded, boss 7.

The extracting jaws 8 are of suitable form and have inwardly bent or angular arms 9 pivotally engaging the pin or bolt 4 to permit movement of the jaws toward and from each other. The jaws are thus adapted to be opened to a greater or less extent to engage the fetus and closed to grasp the same for extraction.

An operating rod 10 is inclosed by the shank and is composed of a short front section 11 and a long rear section 12, swiveled together as at 13. The rear end of the rod section 12 is threaded, as at 14, to work in the threaded boss 7 and is provided with an operating handle 15, whereby said rod section 12 may be rotated and moved forward and backward thereby transmitting a forward and backward sliding movement to the rod section 11. Channeled links 16 pivotally connect the front end of the rod section 11 to the arms of the jaws whereby upon the forward movement of said rod section the jaws will be opened and upon the rearward movement of said rod section the jaws will be closed. The channeled form of the links gives great strength and rigidity, as will be readily understood.

From the foregoing description, taken in connection with the drawing, the construction and mode of use of the device will be readily understood by those versed in the art, and it will be seen that a simple, strong, durable and efficient device for the described purposes is provided and one that may be used without injury to the animal.

Having thus described the invention what I claim as new is:—

A device of the character described comprising a shank of oblong rectangular form and composed of duplicate pairs of spaced rods, the rods of each pair having their forward ends converged and united, a pivot pin uniting the converged forward ends of both pairs of rods, rectangular reinforcing and guide plates connecting the rods at equidistant points in front and rear of the transverse center thereof, a coupling plate uniting the rear ends of all the rods and having an inwardly extending boss provided with threaded apertures, an operating rod inclosed by the shaft and journaled in said reinforcing plates and composed of swiveled front and rear sections, the rear section having a threaded portion engaging said threaded aperture in the boss, an operating handle connected with the rear section of the operating rod, jaws having angular arms pivotally mounted on the aforesaid pivot pin between the forward ends of the rods, and links extending through the spaces between the pairs of rods and connecting said arms with the front section of the operating rod.

In testimony whereof I affix my signature in presence of two witnesses.

FRED POST.

Witnesses:
F. C. GILCHRIST,
J. J. LYNCH.

Copies of this patent may be obtained for five cents each, by addressing the "Commissioner of Patents, Washington, D. C."